US009041977B2

(12) United States Patent
Namiki et al.

(10) Patent No.: US 9,041,977 B2
(45) Date of Patent: May 26, 2015

(54) IMAGE PROCESSING APPARATUS, AND NON-TRANSITORY COMPUTER READABLE MEDIUM STORING PROGRAM SETTING A THRESHOLD VALUE AS A REFERENCE OF A PREVIOUSLY STORED GROUND COLOR AND REMOVING THE GROUND COLOR

(71) Applicant: FUJI XEROX CO., LTD., Tokyo (JP)

(72) Inventors: Tatsuya Namiki, Kanagawa (JP); Hiroshi Hayashi, Kanagawa (JP); Toshiyuki Yamada, Kanagawa (JP); Kenji Ueda, Kanagawa (JP); Hiroshi Niina, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/140,181

(22) Filed: Dec. 24, 2013

(65) Prior Publication Data

US 2014/0362389 A1 Dec. 11, 2014

(30) Foreign Application Priority Data

Jun. 11, 2013 (JP) .................................. 2013-123070

(51) Int. Cl.
*G06F 15/00* (2006.01)
*G06K 15/02* (2006.01)
(52) U.S. Cl.
CPC .................................. *G06K 15/1878* (2013.01)

(58) Field of Classification Search
None
See application file for complete search history.

(56) References Cited

U.S. PATENT DOCUMENTS

| RE39,985 E | * | 1/2008 | Tatsuta ........................... 382/270 |
| 7,502,506 B2 | * | 3/2009 | Matsuda et al. ............... 382/167 |
| 7,889,917 B2 | * | 2/2011 | Minamino ..................... 382/162 |
| 8,027,059 B2 | * | 9/2011 | Mizutani ........................ 358/1.9 |
| 8,305,662 B2 | * | 11/2012 | Oosaki .......................... 358/505 |

FOREIGN PATENT DOCUMENTS

JP        A-8-336048        12/1996

* cited by examiner

*Primary Examiner* — Steven Kau
(74) *Attorney, Agent, or Firm* — Oliff PLC (57) ABSTRACT

In an image processing apparatus, a ground color detecting unit is provided that detects ground color information indicating a ground color from input first image data. A storage unit stores a history of the ground color information detected by the ground color detecting unit, and a setting unit is also provided that sets a first threshold value that is a reference of the ground color based on a representative value of first ground color information indicating a first ground color included in the history stored in the storage unit. A ground color removing unit removes a ground color for input second image data based on the first threshold value which was set by the setting unit. A non-transitory computer readable medium storing a program is also provided, the program causing a processor to perform steps similar to those performed by the image forming apparatus.

19 Claims, 7 Drawing Sheets

| |
|---|
| (L*a*b*)=(90,0,0) |
| (L*a*b*)=(90,1,0) |
| (L*a*b*)=(89,0,0) |
| (L*a*b*)=(89,0,0) |
| (L*a*b*)=(91,0,0) |
| (L*a*b*)=(90,1,0) |
| (L*a*b*)=(90,2,0) |
| (L*a*b*)=(90,0,0) |
| ⋮ |

| |
|---|
| ⋮ |
| (L*a*b*)=(81,0,40) |
| (L*a*b*)=(84,0,10) |
| (L*a*b*)=(85,1,9) |
| (L*a*b*)=(85,0,9) |
| (L*a*b*)=(85,0,10) |

FIG. 9

| FIRST GROUND COLOR INFORMATION | USER IDENTIFICATION INFORMATION |
|---|---|
| (L*a*b*)=(90,0,0) | USER X |
| (L*a*b*)=(90,1,0) | USER X |
| (L*a*b*)=(89,0,0) | USER X |
| (L*a*b*)=(89,0,0) | USER X |
| (L*a*b*)=(91,0,0) | USER Y |
| (L*a*b*)=(90,1,0) | USER Y |
| (L*a*b*)=(90,2,0) | USER Z |
| (L*a*b*)=(90,0,0) | USER X |
| ⋮ | ⋮ |

FIG. 10

| FIRST GROUND COLOR INFORMATION | IDENTIFICATION INFORMATION |
| --- | --- |
| (L*a*b*)=(90,0,0) | FIRST MEDIUM SUPPLY UNIT |
| (L*a*b*)=(90,1,0) | FIRST MEDIUM SUPPLY UNIT |
| (L*a*b*)=(89,0,0) | FIRST MEDIUM SUPPLY UNIT |
| (L*a*b*)=(89,0,0) | FIRST MEDIUM SUPPLY UNIT |
| (L*a*b*)=(91,0,0) | SECOND MEDIUM SUPPLY UNIT |
| (L*a*b*)=(90,1,0) | SECOND MEDIUM SUPPLY UNIT |
| (L*a*b*)=(90,2,0) | FIRST MEDIUM SUPPLY UNIT |
| (L*a*b*)=(90,0,0) | FIRST MEDIUM SUPPLY UNIT |
| ⋮ | ⋮ |

…

IMAGE PROCESSING APPARATUS, AND NON-TRANSITORY COMPUTER READABLE MEDIUM STORING PROGRAM SETTING A THRESHOLD VALUE AS A REFERENCE OF A PREVIOUSLY STORED GROUND COLOR AND REMOVING THE GROUND COLOR

CROSS-REFERENCE TO RELATED APPLICATIONS

This application is based on and claims priority under 35 USC 119 from Japanese Patent Application No. 2013-123070 filed Jun. 11, 2013.

BACKGROUND (i) Technical Field

The present invention relates to an image processing apparatus, and a non-transitory computer readable medium storing a program.

(ii) Related Art

In recent years, yellowish paper such as recycled paper or bluish paper other than white paper is often used in a copy machine or a printer. A technology that removes, when copying an image formed on such a sheet, a ground color of the image has been known.

SUMMARY

According to an aspect of the invention, there is provided an image processing apparatus including:

a ground color detecting unit that detects ground color information indicating a ground color from input first image data;

a storage control unit that causes a storage unit to store a history of the ground color information detected by the ground color detecting unit;

a setting unit that sets a first threshold value that is a reference of the ground color on the basis of a representative value of first ground color information indicating a first ground color included in the history stored in the storage unit; and a ground color removing unit that performs a ground color removal process for input second image data on the basis of the first threshold value set by the setting unit.

BRIEF DESCRIPTION OF THE DRAWINGS

Exemplary embodiments of the present invention will be described in detail based on the following figures, wherein.

DETAILED DESCRIPTION

Figure 1:
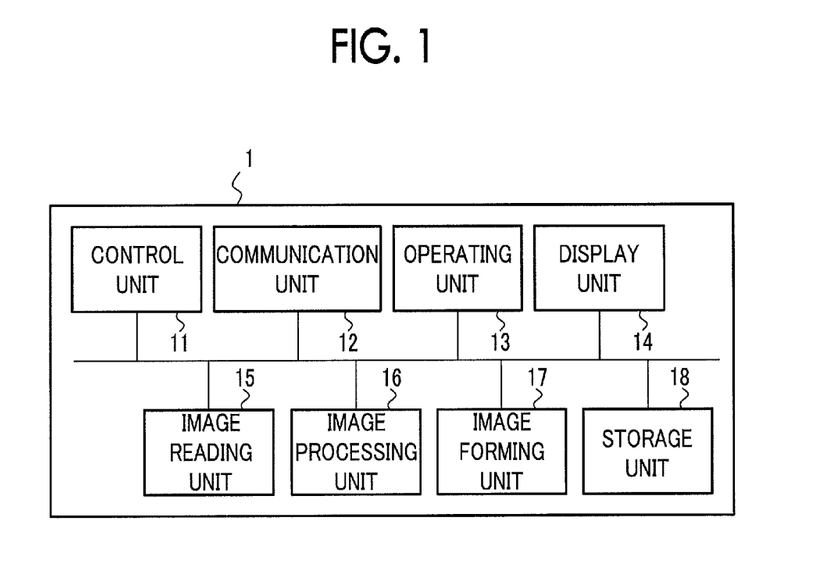
FIG. 1 is a diagram illustrating a hardware configuration of an image processing apparatus according to an exemplary embodiment of the invention.

FIG. 1 is a diagram illustrating a hardware configuration of an image processing apparatus 1 according to an exemplary embodiment of the invention. The image processing apparatus 1 is an apparatus having plural functions such as a scanning function, a copy function and a facsimile function, for example. The image processing apparatus 1 does not necessarily have all of these functions, and may include only the copy function. The image processing apparatus 1 includes a control unit 11, a communication unit 12, an operating unit 13, a display unit 14, an image reading unit 15, an image processing unit 16, an image forming unit 17, and a storage unit 18.

The control unit 11 includes a central processing unit (CPU) and a memory, for example, and controls each unit of the image processing apparatus 1. The CPU executes a program stored in the memory or the storage unit 18. The memory includes a read only memory (ROM) and a random access memory (RAM), for example. The ROM stores a program or data in advance. The RAM temporarily stores a program or data, and is used as a work area when the CPU executes the program.

The communication unit 12 is a communication interface connected to a communication line. The communication unit 12 performs communication with a terminal apparatus or a different image processing apparatus 1 (not shown) used by a user through the communication line. The operating unit 13 includes a touch panel and various keys, for example, through which information according to operation of the user is input to the control unit 11. The display unit 14 is a liquid crystal display, for example, and displays a variety of information.

The image reading unit 15 is an image scanner, for example, and reads an image of an original document to generate image data. The image processing unit 16 performs various image processings for the image data. The image processing unit 16 is configured by the CPU and the memory, for example. The image forming unit 17 forms an image based on the image data on a sheet-shaped medium such as a sheet. The image forming unit 17 may form the image by an electrographic method, or may form the image by other methods. Further, the image forming unit 17 includes plural medium supply units that perform storage and supply of the sheet-shaped medium used in formation of the image. The storage unit 18 is a hard disk, for example, and stores various programs or data used by the control unit 11. Further, the storage unit 18 stores a history of ground color information detected from image data (an example of first image data) in a past copy process.

Figure 2:
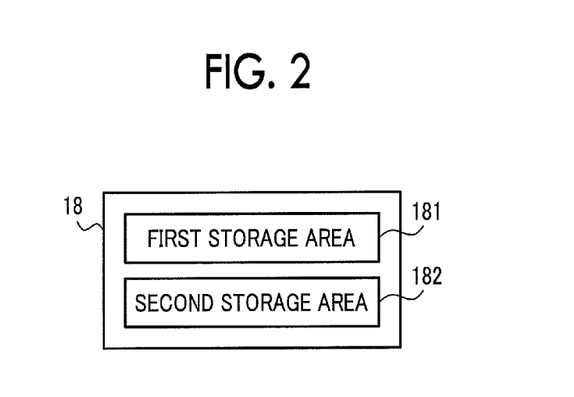
FIG. 2 is a diagram illustrating an example of a storage area included in a storage unit.

FIG. 2 is a diagram illustrating an example of a storage area included in the storage unit 18. The storage unit 18 includes a first storage area 181 (an example of a first storage unit) and a second storage area 182 (an example of a second storage unit). First ground color information indicating a first ground color included in a detection history of the ground color information is stored in the first storage area 181. Second ground color information indicating a second ground color different from the first ground color included in the detection history of the ground color information is stored in the second storage area 182. Here, ground color information indicating a ground color that is not a ground color removal object is not stored in the second storage area 182. In image formation, a color sheet called color paper may be used. The color that is not the ground color removal object represents the color of the color paper, for example.

Figure 3:
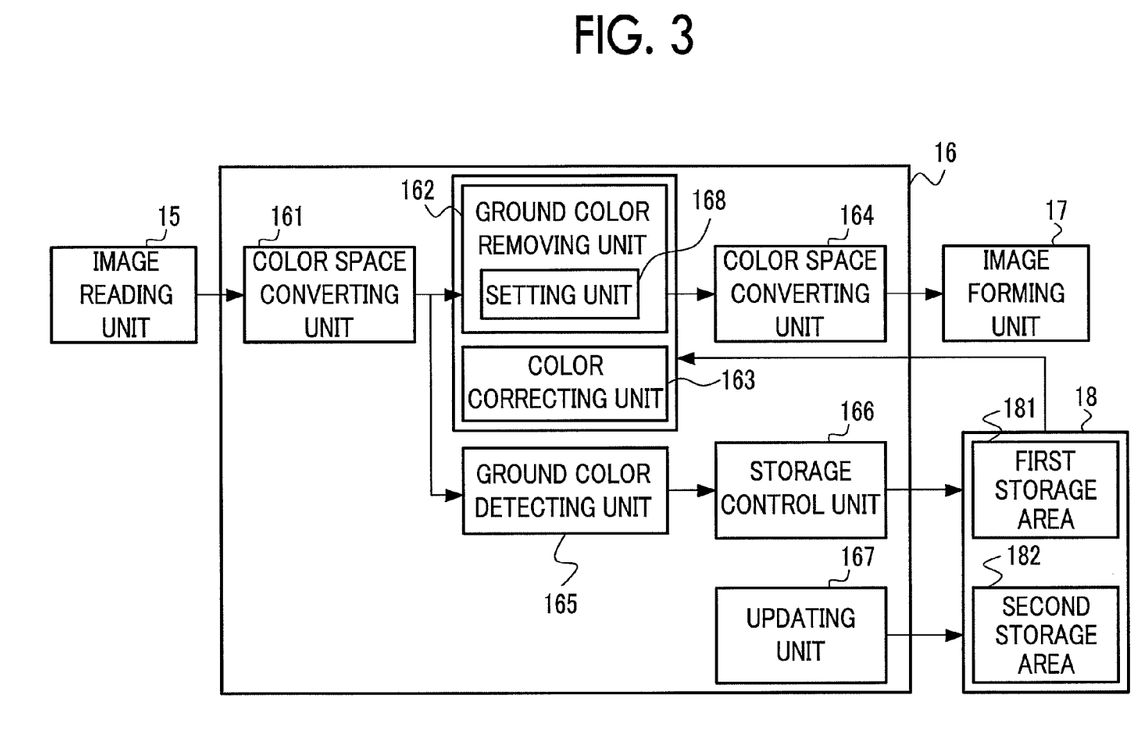
FIG. 3 is a diagram illustrating a functional configuration of an image processing unit.

FIG. 3 is a diagram illustrating a functional configuration of the image processing unit 16. The image processing unit 16 includes a color space converting unit 161, a ground color removing unit 162, a color correcting unit 163, a color space converting unit 164, a ground color detecting unit 165, a storage control unit 166, and an updating unit 167. These functions are realized as the CPU executes one or plural programs, for example.

If an original document is set in the image reading unit 15 by the user and a copy execution instruction is input through the operating unit 13, image data that represents an image of the original document is input to the image processing unit through the image reading unit 15. The color space converting unit 161 converts a color space of the input image data into a color space corresponding to the image processing unit 16. For example, when the color space of the input image data is an RGB color space and the color space corresponding to the image processing unit 16 is an $L^*a^*b^*$ color space, the color space of the image data is converted into the $L^*a^*b^*$ color space from the RGB color space.

The ground color removing unit 162 performs a ground color removal process for the image data (an example of second image data) converted by the color space converting unit 161. The ground color removing unit 162 includes a setting unit 168. The setting unit 168 sets a threshold value (an example of a first threshold value) that is a reference of the ground color on the basis of a representative value of the first ground color information stored in the first storage area 181. As the representative value, a value that is the most distantly separated from a value of a white level among values of $L^*a^*b^*$ stored in the first storage area 181 is used, for example.

Figure 4:
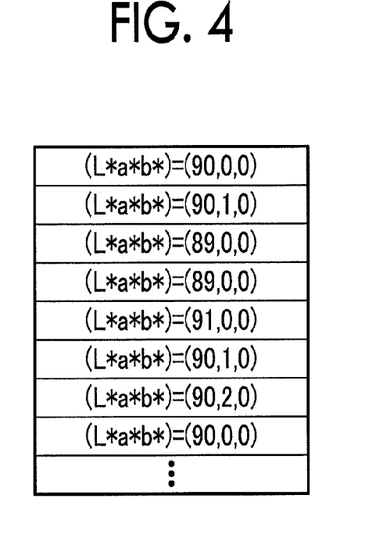
FIG. 4 is a diagram illustrating an example of a detection history of first ground color information stored in a first storage area.

FIG. 4 is a diagram illustrating an example of a detection history of the first ground color information stored in the first storage area 181. In the example shown in FIG. 4, since a value of $L^*$ that is the most distantly separated from the value of the white level is 89, a value of $a^*$ that is the most distantly separated from the value of the white level is 2, and a value of $b^*$ that is the most distantly separated from the value of the white level is 0, the representative value of the first ground color information becomes $(L^*a^*b^*)=(89, 2, 0)$. In this case, a threshold value of $(L^*a^*b^*)=(89, 2, 0)$ is set.

The ground color removing unit 162 performs the ground color removal process for the image data converted by the color space converting unit 161 on the basis of the threshold value set by the setting unit 168. Specifically, the ground color removing unit 162 firstly specifies a ground color area of an image on the basis of the threshold value set by the setting unit 168. For example, when the value of $L^*a^*b^*$ is set as the threshold value, with respect to the value of $L^*$, the value of the white level is included in the range of the threshold value or more, and with respect to the values of $a^*$ and $b^*$, the value of the white level is included in the range of an absolute value of the threshold value or less. Thus, an area including color information in which the value of $L^*$ is the threshold value or more, the absolute value of $a^*$ is the threshold value or less and the absolute value of $b^*$ is the threshold value or less is specified as the ground color area. Then, the ground color removing unit 162 converts the color information in the specified ground color area into color information on the white level.

Figure 5A:
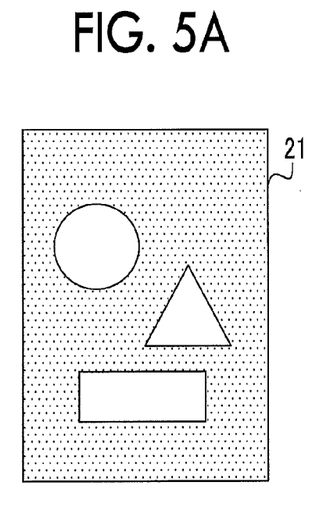
FIGS. 5A and 5B are diagrams illustrating a process of a ground color removing unit.
Figure 5B:
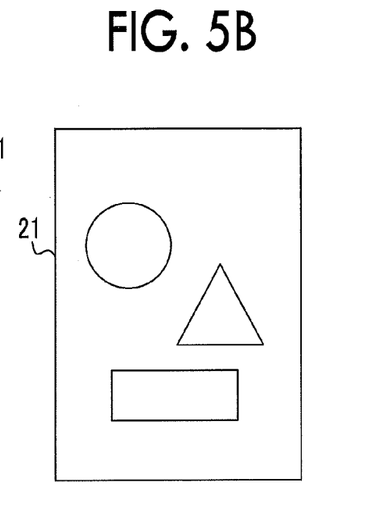

FIGS. 5A and 5B are diagrams illustrating the process of the ground color removing unit 162. Here, a case in which a color information of $(L^*a^*b^*)=(89, 2, 0)$ is set as the threshold value by the setting unit 168 will be described as an example. A shaded part of an image 21 shown in FIG. 5A includes ground color information in which the value of $L^*$ is 90, the value of $a^*$ is 0 and the value of $L^*$ is 0. Since the value of $L^*$ of the ground color information is greater than 89, which is the threshold value, the absolute value of $a^*$ is less than 2, which is the threshold value, and the absolute value of $b^*$ is 0, which is the threshold value or less, the shaded part is specified as the ground color area. In this case, the color information in the shaded part is converted into the color information on the white level. Thus, as shown in FIG. 5B, the ground color is removed from the image 21.

When the first ground color information stored in the first storage area 181 represents a color other than white, the color correcting unit 163 performs a color correction process for the image data in which the ground color removal process is performed by the ground color removing unit 162. For example, when the first ground color information stored in the first storage area 181 represents a yellowish-color like a color of recycled paper, a process of suppressing the tone of yellow is performed.

Here, a specific method of the color correcting process will be described. As the method of the color correcting process, for example, a method of correcting a color of an entire image by a pixel calculation, and a method of correcting a color of a specific part of an image using a lookup table may be used. Here, the specific part corresponds to a highlighted part with low density, for example. The reason why only the color of the highlighted part is corrected is that the highlighted part is easily affected by the ground color compared with a part with high density.

For example, when performing the process of suppressing the tone of yellow by the former method, the calculation is performed so that the value of $b^*$ becomes a value in which the tone of yellow is suppressed for each pixel that forms the image. On the other hand, when performing the process of suppressing the tone of yellow by the latter method, the value of $b^*$ of the highlighted part of the image is converted into a value in which the tone of yellow is suppressed using the lookup table, for example. In the lookup table, a value in which the tone of yellow is suppressed is stored as an output value of $b^*$, within an area including the value of $L^*a^*b^*$ indicating the color of the highlighted part.

The color space converting unit 164 converts the color space of the image data in which the ground color removal process is performed by the ground color removing unit 162 or the color correction process is performed by the color correcting unit 163, into the color space corresponding to the image forming unit 17. For example, when the color space corresponding to the image processing unit 16 is the color space of $L^*a^*b^*$, the color space of the image data is converted into a color space of CMYK from the color space of $L^*a^*b^*$.

The image data converted by the color space converting unit 164 is output to the image forming unit 17. Thus, in the image forming unit 17, an image based on the image data is formed on a recording medium.

Further, the image processing unit 16 detects the ground color information indicating the ground color from the input image data while the above-mentioned processes are being performed or after the above-mentioned processes are finished, and performs a history recording process of recording the detected ground color information as a history. The ground color information recorded in the history recording process is not used in image processing of image data that is currently input, but is used in image processing of image data that is input the next time or thereafter.

The ground color detecting unit 165 detects the ground color information indicating the ground color from the image data converted by the color space converting unit 161. The detection of the ground color information is performed on the basis of a histogram that represents distribution of the image color information, for example. The histogram may be made on the basis of the color information of the entire image, or may be made on the basis of color information on a leading edge of the image.

The storage control unit 166 causes the first storage area 181 or the second storage area 182 to store the history of the ground color information detected by the ground color detecting unit 165. The updating unit 167 updates the first ground color information stored in the first storage area 181.

Figure 6:
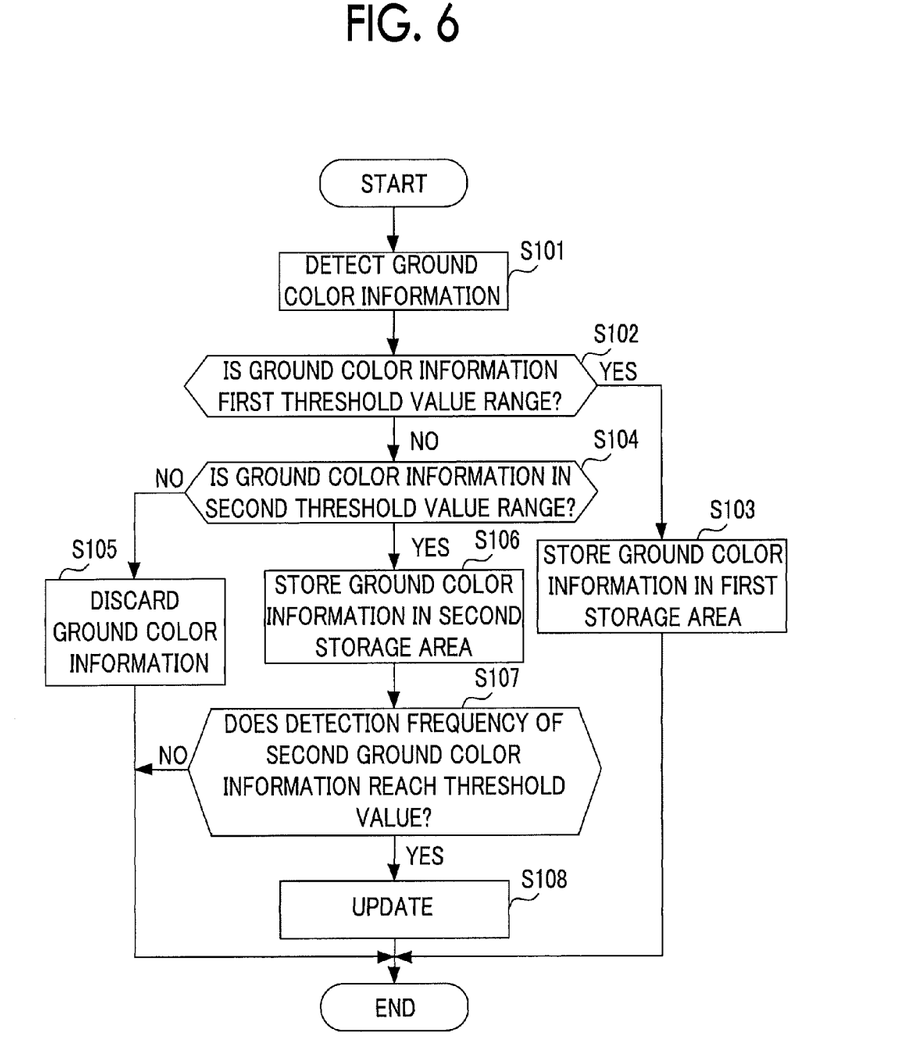
FIG. 6 is a flowchart illustrating a history recording process.

FIG. 6 is a flowchart illustrating the history recording process. In step S101, the ground color detecting unit 165 detects the ground color information indicating the ground color from the image data converted by the color space converting unit 161. Specifically, the ground color detecting unit 165 makes a histogram that represents the distribution of the image color information on the basis of the image data converted by the color space converting unit 161, and detects the ground color information on the basis of the formed histogram. For example, when the color space of the image data is the color space of $L^*a^*b^*$, a histogram that represents distribution of the value of $L^*a^*b^*$ is made.

Figure 7:
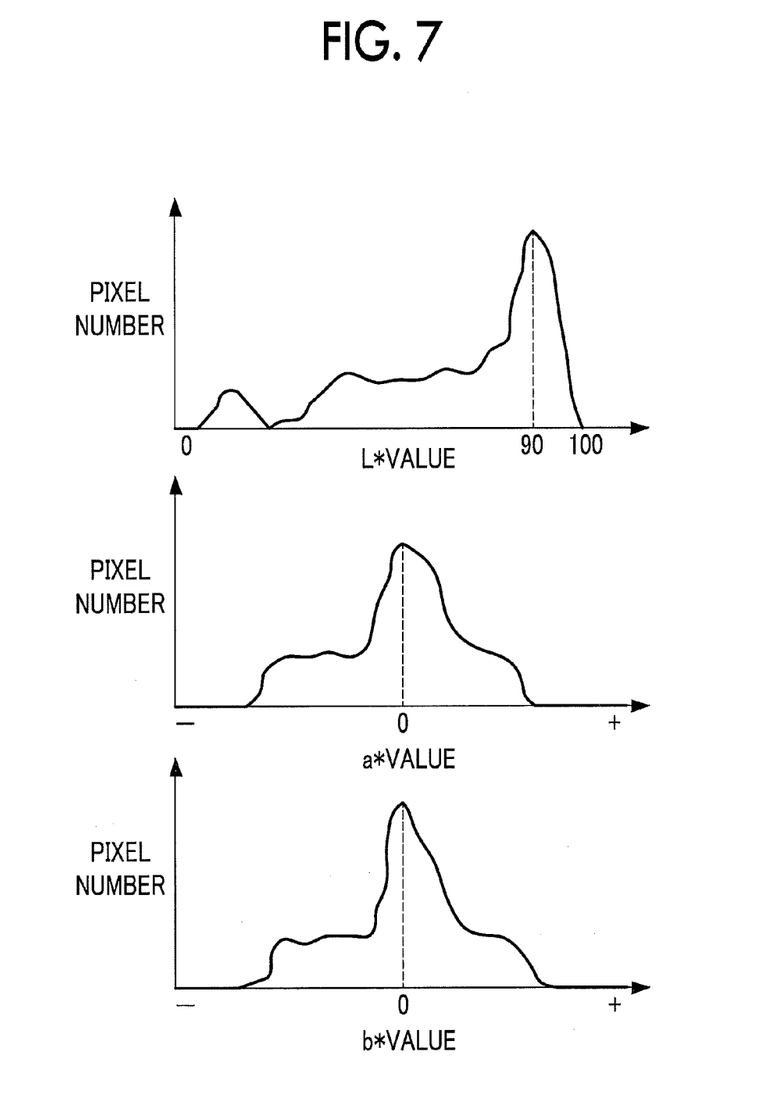
FIG. 7 is a diagram illustrating an example of a histogram which represents distribution of values of $L^*a^*b^*$.

FIG. 7 is a diagram illustrating an example of a histogram that represents the distribution of the value of $L^*a^*b^*$. In the example shown in FIG. 7, a peak of the value of $L^*$ is 90, a peak of the value of $a^*$ is 0, and a peak of the value of $b^*$ is 0. In this case, ground color information of $(L^*a^*b^*)=(90, 0, 0)$ is detected. When there are plural peaks, a value of the highest peak is used.

In step S102, the storage control unit 166 sets a first threshold value range on the basis of the first ground color information stored in the first storage area 181, and determines whether the ground color information detected in step S101 is included in the first threshold value range. The first threshold value range is set on the basis of a representative value of the first ground color information stored in the first storage area 181 and an error range of ground color information indicating a predetermined single ground color, for example. The representative value is an average value, for example.

For example, when the average value of the values of $L^*a^*b^*$ stored in the first storage area 181 is (90, 1, 0) and the error range is set to ±2, a range in which the value of $L^*$ is 88 to 92, the value of $a^*$ is −1 to 3 and the value of $b^*$ is −2 to 2 is set as the first threshold value range. When the ground color information detected in step S101 is $(L^*a^*b^*)=(90, 0, 0)$, since the value of $L^*$ is between 88 and 92, the value of $a^*$ is between −1 and 3 and the value of $b^*$ is between −2 and 2, it is determined that the ground color information is included in the first threshold value range.

When it is determined in step S102 that the ground color information detected in step S101 is included in the first threshold value range, the procedure goes to step S103. In step S103, the storage control unit 166 causes the first storage area 181 to store the ground color information detected in step S101 as the first ground color information. An upper limit (for example, 50) is set to the number of the first ground color information stored in the first storage area 181. When the first ground color information of the upper limit number is already stored in the first storage area 181, the storage control unit 166 deletes the oldest one of the first ground color information stored in the first storage area 181, and then causes the first storage area 181 to store new first ground color information.

On the other hand, when it is determined in step S102 that the ground color information detected in step S101 is not included in the first threshold value range, the procedure goes to step S104. In step S104, the storage control unit 166 determines whether the ground color information detected in step S101 is included in a second threshold value range that is a reference of the color that is the ground color removal object. The second threshold value range is set in a predetermined range in which a color that is not the ground color removal object is excluded. The color that is not the ground color removal object is a color of color paper, for example.

When it is determined in step S104 that the ground color information detected in step S101 is not included in the second threshold value range, the procedure goes to step S105. In step S105, the storage control unit 166 discards the ground color information detected in step S101 without causing the storage unit 18 to store the ground color information.

On the other hand, when it is determined in step S104 that the ground color information detected in step S101 is included in the second threshold value range, the procedure goes to step S106. In step S106, the storage control unit 166 causes the second storage area 182 to store the ground color information detected in step S101 as the second ground color information. An upper limit (for example, 20) is also set to the number of the second ground color information stored in the second storage area 182. When the second ground color information of the upper limit number is already stored in the second storage area 182, the storage control unit 166 deletes the oldest one of the second ground color information stored in the second storage area 182, and then causes the second storage area 182 to store new second ground color information.

In step S107, the updating unit 167 calculates a detection frequency of the second ground color information indicating the second ground color different from the first ground color indicated by the first ground color information stored in the first storage area 181, on the basis of the second ground color information stored in the second storage area 182, and determines whether the calculated value reaches a threshold value (an example of a second threshold value). The detection frequency is a value obtained by calculating the number of times of continuous detection of the second ground color information indicating a single second ground color, for example. In the second ground color information stored in the second storage area 182, the second ground color information indicating the single second ground color includes values that are close to each other. The second ground color information indicating the single second ground color is determined on the basis of an error range of ground color information indicating a predetermined single ground color, for example.

Figure 8:
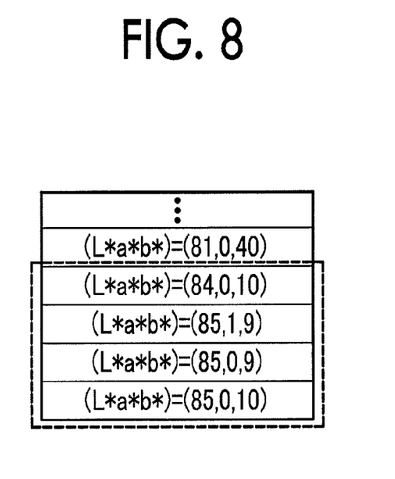
FIG. 8 is a diagram illustrating an example of a detection history of second ground color information stored in a second storage area.

FIG. 8 is a diagram illustrating an example of the detection history of the second ground color information stored in the second storage area 182. In the example shown in FIG. 8, the second ground color information is arranged from the top in chronological order of storage date and time in the second storage area 182. Here, a case where the threshold value is 4 and the error range is set to ±2 will be described as an example. Since pieces of second ground color information of $(L^*a^*b)=(84, 0, 10), (85, 1, 9), (85, 0, 9)$ and $(85, 0, 10)$ among the second storage information shown in FIG. 8 are included in the error range of ±2 with reference to any second ground color information, the second ground color information represents a single ground color. Further, the four pieces of second ground color information are continuously detected. In this case, since the second ground color information indicating the single second ground color is continuously detected four times, the four times is calculated as the detection frequency of the second ground color information. Accordingly, it is determined that the detection frequency of the second ground color information reaches the threshold value.

When it is determined in step S107 that the detection frequency of the second ground color information reaches the threshold value, the procedure goes to step S108. In step S108, the updating unit 167 updates the first ground color information stored in the first storage area 181. Specifically, the updating unit 167 deletes all the first ground color information stored in the first storage area 181, and then reads the second ground color information in which it is determined in step S107 that the detection frequency reaches the threshold value from the second storage area 182, and stores the result in the first storage area 181 as the first ground color information. In the example shown in FIG. 8, the pieces of second ground color information of (L*a*b)=(84, 0, 10), (85, 1, 9), (85, 0, 9) and (85, 0, 10) are read from the second storage area 182, and are stored in the first storage area 181 instead of the first ground color information shown in FIG. 4. Thus, ground color information indicating a single ground color in which the detection frequency is constantly high is stored in the first storage area 181.

The first ground color information that is newly stored in the first storage area 181 in this way is used in the process of the ground color removing unit 162 or the process of the color correcting unit 163 when image data is input the next time through the image reading unit 15.

On the other hand, when it is determined in step S107 that the detection frequency of the second ground color information does not reach the threshold value, the history recording process is finished without updating the first ground color information stored in the first storage area 181.

In the related art, the ground color information is detected from the image data, and then, the ground color removal process is performed for the image data on the basis of the detection result. Thus, in the process of detecting the ground color information, when a histogram is made on the basis of color information of the entire image, it is necessary to perform pre-scanning or to store the image data in a memory. However, when the pre-scanning is performed, it takes time for the process. Further, when the image data is stored in the memory, it is necessary to provide a memory with a large storage capacity, which results in increase in manufacturing cost. On the other hand, when a histogram is made on the basis of color information on a leading edge of an image, these problems do not occur, but when dirt or punched holes are present on the leading edge, it is difficult to correctly detect the ground color information.

According to the above-described exemplary embodiment, in the ground color removing unit 162, the threshold value that is the reference of the ground color is set on the basis of the detection history of the ground color information stored in the storage unit 18, and the ground color information detected from the image data that is the processing object is not used. Accordingly, the ground color removal process for the image data is realized without using the ground color information detected from the image data that is the processing object. In this case, since it is not necessary to perform pre-scanning, the time taken for the process is reduced. Further, since only the ground color information is stored in the storage unit 18 and it is not necessary to store the image data, it is not necessary to provide a memory with a large storage capacity, and thus, the manufacturing cost is reduced. Further, since the histogram may be made on the basis of the color information of the entire image, the ground color information is correctly detected even when dirt or punched holes are present on the leading edge.

Further, according to the present exemplary embodiment, in the color correcting unit 163, the ground color influence correction process is performed on the basis of the detection history of the ground color information stored in the storage unit 18, and the ground color information detected from the image data that is the processing object is not used. Accordingly, the ground color influence correction process for the image data is realized without using the ground color information detected from the image data that is the processing object.

Further, according to the present exemplary embodiment, by updating the ground color information stored in the first storage area 181, a tendency change of the ground color is reflected in the ground color removal process. Thus, the accuracy of the ground color removal process is increased.

MODIFICATION EXAMPLES

The above-described exemplary embodiment is an example of the invention. The exemplary embodiment may be modified as follows. Further, the following modification examples may be combined with each other.

(1) In the above-described exemplary embodiment, the detection history of the ground color information may be recorded for each user. In this case, the user inputs identification information on the user through the operating unit 13 when using the image processing apparatus 1. The identification information is a user ID, for example. The storage control unit 166 obtains the identification information input by the user, and causes the storage unit 18 to store ground information in association with the acquired identification information in step S103 or S106.

Figure 9:
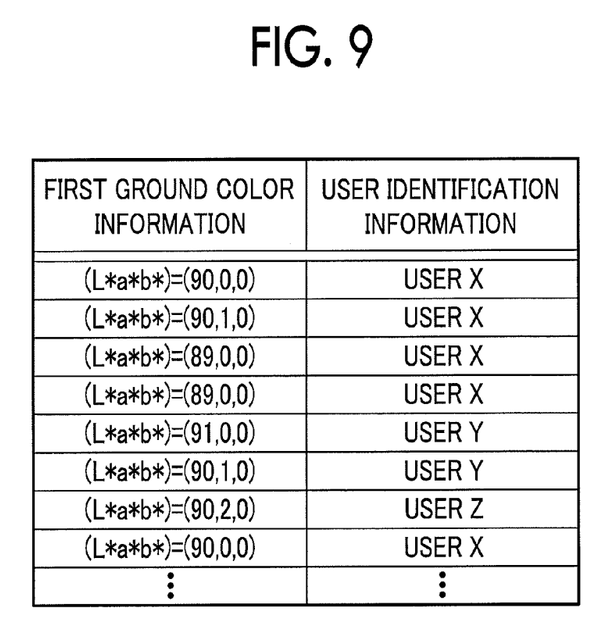
FIG. 9 is a diagram illustrating an example of a detection history of first ground color information stored in a first storage area according to a modification example.

FIG. 9 is a diagram illustrating an example of the detection history of the first ground color information stored in the first storage area 181 according to a modification example. For example, if identification information is input by a user X through the operating unit 13 and a first copy process is started, the storage control unit 166 obtains the input identification information on the user X. In this case, in step S103, as shown in FIG. 9, ground color information of (L*a*b*)= (90, 0, 0) detected in step S101 is stored in the first storage area 181 in association with the identification information on the user X.

Further, the setting unit 168 according to the present modification example obtains the identification information input by the user, and sets a threshold value that is a reference of a ground color on the basis of the first ground color information stored in association with the acquired identification information, among the first ground color information stored in the first storage area 181. For example, after the first copy process is completed, if the identification information is input again by the user X and a second copy process is started, the setting unit 168 obtains the input identification information on the user X. In this case, in the setting unit 168, the threshold value that is the reference of the ground color is set on the basis of the first ground color information stored in association with the identification information on the user X, among the first ground color information shown in FIG. 9.

According to the present modification example, since the ground color removal process is performed on the basis of the detection history of the ground color information recorded for each user, a tendency of a ground color of a medium used by the user is reflected in the ground color removal process. Thus, for example, even when the ground color of the medium used in image formation is different for each user, the ground color is removed with high accuracy.

(2) In the above-described exemplary embodiment, the detection history of the ground color information may be stored for each medium supply unit used by the user. In this case, the user performs an operation of selecting the medium supply unit in which a medium to be used in the copy process is stored using the operating unit 13 when instructing execution of the copy process. The storage control unit 166 obtains identification information on the medium supply unit selected by the user, and stores ground color information in the storage unit 18 in association with the acquired identification information in step S103 or step S106. This identification information is ID of the medium supply unit, for example.

Figure 10:
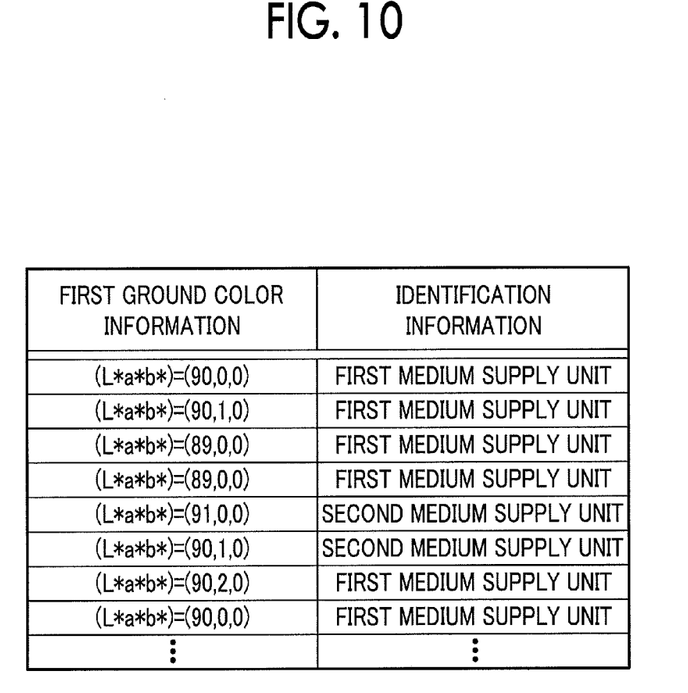
FIG. 10 is a diagram illustrating an example of a detection history of first ground color information stored in a first storage area according to a modification example.

FIG. 10 is a diagram illustrating an example of the detection history of the first ground color information stored in the first storage area 181 according to a modification example. For example, if the first medium supply unit is selected by the user and the first copy process is started, the storage control unit 166 obtains identification information on the selected first medium supply unit. In this case, in step S103, as shown in FIG. 10, ground color information of (L*a*b*)=(90, 0, 0) detected in step S101 is stored in the first storage area 181 in association with the identification information on the first medium supply unit.

Further, the setting unit 168 according to the present modification example obtains the identification information on the medium supply unit selected by the user, and sets a threshold value that is a reference of a ground color on the basis of the first ground color information stored in association with the acquired identification information, among the first ground color information stored in the first storage area 181. For example, after the first copy process is completed, if the first medium supply unit is selected again by the user and the second copy process is started, the setting unit 168 obtains the identification information on the selected first medium supply unit. In this case, in the setting unit 168, the threshold value that is the reference of the ground color is set on the basis of the first ground color information stored in association with the identification information on the first medium supply unit, among the first ground color information shown in FIG. 10.

When plural medium supply units are provided in the image processing apparatus 1, mediums of different colors may be stored in the respective medium supply units. In such a situation, when copying an image of an original document, a medium having the same ground color as in the original document may be generally used. Accordingly, when the same medium supply unit is selected to perform the image copying process, it is considered that ground colors of both images are very likely to be the same. On the other hand, when different medium supply units are selected to perform the image copying process, it is considered that ground colors of both images are very likely to be different from each other. According to the present modification example, since the ground color removal process is performed on the basis of the detection history of the ground color information recorded in each medium supply unit to be used by the user, the tendency of the ground color estimated from the medium supply unit to be used by the user is reflected in the ground color removal process. Thus, for example, even when the ground colors of the mediums to be supplied to the respective medium supply units are different, the ground color is removed with high accuracy.

(3) In the above-described exemplary embodiment, an example has been described in which the maximum value or the minimum value of the first ground color information stored in the first storage area 181 is used as the representative value when the threshold value that is the reference of the ground color is set. However, the representative value of the first ground color information used when the threshold value that is the reference of the ground color is set is not limited to the maximum value or the minimum value. For example, the representative value may be an average value or a mode.

(4) In the above-described exemplary embodiment, an example has been described in which the average value of the first ground color information stored in the first storage area 181 is used as the representative value when the first threshold value range is set in step S102. However, the representative value of the first ground color information used when the first threshold value range is set is not limited to the average value. For example, the representative value may be a mode, a maximum value or a minimum value.

Further, the first threshold value range may be set on the basis of the type of the original document determined from the first ground color information stored in the first storage area 181. For example, when a white sheet is determined as the type of the original document on the basis of the first ground color information stored in the first storage area 181, a color range predetermined as a color range of a general white sheet is set as the first threshold value range.

(5) In the above-described exemplary embodiment, an example has been described in which the second threshold value range used in step S104 is set in advance. However, the second threshold value range may be set on the basis of the first threshold value range. In this case, the second threshold value range is set to be wider than the first threshold value range.

(6) In the above-described exemplary embodiment, in step S107, an example has been described in which the detection frequency of the second ground color information is the value obtained by calculating the number of times of the continuous detection of the second ground color information indicating the single second ground color. However, the detection frequency of the second ground color information is not limited to the number of times of the continuous detection of the second ground color information indicating the single second ground color. For example, the detection frequency of the second ground color information may be a value obtained by calculating the ratio of the number of the second ground color information indicating a certain second ground color to the total number of the second ground color information stored in the second storage area 182. In this case, for example, when the ratio reaches a threshold value (for example, 50%), it is determined that the detection frequency of the second ground color information reaches the threshold value.

(7) The image processing performed by the image processing unit 16 is not limited to the process described in the exemplary embodiment. For example, the image processing unit 16 may perform a process of sharpening an image using a space filter or a process of suppressing moire.

(8) In the above-described exemplary embodiment, an example has been described in which the image processing unit 16 is configured by the CPU and the memory. However, the image processing unit 16 may be configured using an application specific integrated circuit (ASIC). In this case, a part or all of the functional configurations of the image processing unit 16 may be realized by the ASIC.

(9) In the above-described exemplary embodiment, the program executed by the image processing unit 16 may be downloaded through a communication line such as the Internet. Further, the program may be provided in a state of being recorded on a computer-readable recording medium such as a magnetic recording medium (magnetic tape, magnetic disc or the like), an optical recording medium (optical disc or the like), a magneto-optical recording medium, or a semiconductor memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a ground color detecting unit that detects ground color information indicating a ground color from input first image data;
a storage control unit that causes a storage unit to store a history of the ground color information detected by the ground color detecting unit;
a setting unit that sets a first threshold value that is a reference of the ground color on the basis of a representative value of first ground color information indicating a first ground color included in the history stored in the storage unit; and
a ground color removing unit that performs a ground color removal process for input second image data on the basis of the first threshold value set by the setting unit;
wherein the storage unit includes a first storage unit that stores the first ground color information among the ground color information detected by the ground color detecting unit, and a second storage unit that stores second ground color information indicating a second ground color different from the first ground color, and
wherein the setting unit sets the first threshold value on the basis of the representative value of the first ground color information stored in the first storage unit,
the image processing apparatus further comprising:
an updating unit that updates, when a detection frequency of the second ground color information reaches a second threshold value in the history, the first ground color information stored in the first storage unit by storing the second ground color information instead of the first ground color information in the first storage unit.

2. The image processing apparatus according to claim 1, wherein the setting unit sets, when a detection frequency of second ground color information indicating a second ground color different from the first ground color in the history reaches a second threshold value, the first threshold value on the basis of the second ground color information instead of the first ground color information.

3. The image processing apparatus according to claim 2, wherein the storage unit includes a first storage unit that stores the first ground color information among the ground color information detected by the ground color detecting unit, and a second storage unit that stores the second ground color information indicating the second ground color different from the first ground color, and
wherein the setting unit sets the first threshold value on the basis of the representative value of the first ground color information stored in the first storage unit,
the image processing apparatus further comprising:
an updating unit that updates, when the detection frequency of the second ground color information reaches the second threshold value in the history, the first ground color information stored in the first storage unit by storing the second ground color information instead of the first ground color information in the first storage unit.

4. The image processing apparatus according to claim 1, wherein the storage control unit acquires identification information on a user corresponding to the first image data, and causes the storage unit to store the history of the ground color information detected by the ground color detecting unit for each acquired piece of identification information, and
wherein the setting unit acquires identification information on a user corresponding to the second image data, and sets the first threshold value on the basis of the history corresponding to the acquired identification information among the history stored in the storage unit.

5. The image processing apparatus according to claim 2, wherein the storage control unit acquires identification information on a user corresponding to the first image data, and causes the storage unit to store the history of the ground color information detected by the ground color detecting unit for each acquired piece of identification information, and
wherein the setting unit acquires identification information on a user corresponding to the second image data, and sets the first threshold value on the basis of the history corresponding to the acquired identification information among the history stored in the storage unit.

6. The image processing apparatus according to claim 1, wherein the storage control unit acquires identification information on a user corresponding to the first image data, and causes the storage unit to store the history of the ground color information detected by the ground color detecting unit for each acquired piece of identification information, and
wherein the setting unit acquires identification information on a user corresponding to the second image data, and sets the first threshold value on the basis of the history corresponding to the acquired identification information among the history stored in the storage unit.

7. The image processing apparatus according to claim 3, wherein the storage control unit acquires identification information on a user corresponding to the first image data, and causes the storage unit to store the history of the ground color information detected by the ground color detecting unit for each acquired piece of identification information, and
wherein the setting unit acquires identification information on a user corresponding to the second image data, and sets the first threshold value on the basis of the history corresponding to the acquired identification information among the history stored in the storage unit.

8. The image processing apparatus according to claim 1, wherein the storage control unit acquires, when an image based on the first image data is formed on a medium, identification information on a medium supply unit for use in supply of the medium, and stores the history of the ground color information detected by the ground color detecting unit in the storage unit for each acquired piece of identification information, and
wherein the setting unit acquires, when an image based on the second image data is supplied to a medium, identification information on a medium supply unit for use in supply of the medium, and sets the first threshold value on the basis of the history corresponding to the acquired identification information among the history stored in the first storage unit.

9. The image processing apparatus according to claim 2, wherein the storage control unit acquires, when an image based on the first image data is formed on a medium, identification information on a medium supply unit for use in supply of the medium, and stores the history of the ground color information detected by the ground color detecting unit in the storage unit for each acquired piece of identification information, and wherein the setting unit acquires, when an image based on the second image data is supplied to a medium, identification information on a medium supply unit for use in supply of the medium, and sets the first threshold value on the basis of the history corresponding to the acquired identification information among the history stored in the first storage unit.

10. The image processing apparatus according to claim 1, wherein the storage control unit acquires, when an image based on the first image data is formed on a medium identification information on a medium supply unit for use in supply of the medium, and stores the history of the ground color information detected by the ground color detecting unit in the storage unit for each acquired piece of identification information, and wherein the setting unit acquires, when an image based on the second image data is supplied to a medium, identification information on a medium supply unit for use in supply of the medium, and sets the first threshold value on the basis of the history corresponding to the, acquired identification information among the history stored in the first storage unit.

11. The image processing apparatus according to claim 3, wherein the storage control unit acquires, when an image based on the first image data is formed on a medium, identification information on a medium supply unit for use in supply of the medium, and stores the history of the ground color information detected by the ground color detecting unit in the storage unit for each acquired piece of identification information, and wherein the setting unit acquires, when an image based on the second image data is supplied to a medium, identification information on a medium supply unit for use in supply of the medium, and sets the first threshold value on the basis of the history corresponding to the acquired identification information among the history stored in the first storage unit.

12. The image processing apparatus according to claim 1, further comprising:
a color correcting unit that performs a color correction process for the second image data when the first ground color information indicates a color other than white.

13. The image processing apparatus according to claim 2, further comprising:
a color correcting unit that performs a color correction process for the second image data when the first ground color information indicates a color other than white.

14. The image processing apparatus according to claim 1, further comprising:
a color correcting unit that performs a color correction process for the second image data when the first ground color information indicates a color other than white.

15. The image processing apparatus according to claim 3, further comprising:
a color correcting unit that performs a color correction process for the second image data when the first ground color information indicates a color other than white.

16. The image processing apparatus according to claim 4, further comprising:
a color correcting unit that performs a color correction process for the second image data when the first ground color information indicates a color other than white.

17. The image processing apparatus according to claim 5, further comprising:
a color correcting unit that performs a color correction process for the second image data when the first ground color information indicates a color other than white.

18. The image processing apparatus according to claim 1, further comprising:
an image reading unit that reads an image to generate image data; and
an image forming unit that forms an image based on the second image data in which the ground color removal process is performed by the ground color removing unit.

19. A non-transitory computer readable medium storing a program that causes a computer including a storage unit to execute:
detecting ground color information indicating a ground color from input first image data;
storing a history of the detected ground color information in the storage unit;
setting a first threshold value that is a reference of the ground color on the basis of a representative value of first ground color information indicating a first ground color included in the history stored in the storage unit;
performing a ground color removal process for input second image data on the basis of the set first threshold value;
storing the first ground color information among the ground color information detected, and storing second ground color information indicating a second ground color different from the first ground color;
setting the first threshold value on the basis of the representative value of the first ground color information stored; and
updating, when a detection frequency of the second ground color information reaches a second threshold value in the history, the first ground color information stored by storing the second ground color information instead of the first ground color information.

* * * * *